United States Patent

[11] 3,629,995

| [72] | Inventors | John Moten, Jr.<br>University City, Mo.;<br>Walter A. Kluthe, East St. Louis, Ill. |
|---|---|---|
| [21] | Appl. No. | 888,403 |
| [22] | Filed | Dec. 29, 1969 |
| [45] | Patented | Dec. 28, 1971 |
| [73] | Assignee | Laclede Gas Company<br>St. Louis, Mo. |

[54] A METHOD FOR REDUCING MOISTURE CONTENT IN GAS
6 Claims, 4 Drawing Figs.

[52] U.S. Cl. .................................................. 55/33
[51] Int. Cl. .................................................. B01d 53/04
[50] Field of Search.......................................... 55/32–35, 74, 387, 388, 281

[56] References Cited
UNITED STATES PATENTS

| 2,138,689 | 11/1938 | Altenkirch .................. | 55/33 |
| 2,196,021 | 4/1940 | Merrill ........................ | 55/388 |
| 2,845,138 | 7/1958 | Gageby ........................ | 55/387 |
| 2,993,563 | 7/1961 | Munters et al. ............... | 55/34 |
| 3,205,638 | 9/1965 | Hagle .......................... | 55/33 |
| 3,400,515 | 9/1968 | Ackerman ..................... | 55/33 |

*Primary Examiner*—Reuben Friedman
*Assistant Examiner*—Charles N. Hart
*Attorney*—Gravely, Lieder & Woodruff

ABSTRACT: A method for removing a portion of the moisture from gas streams by passing the gas stream over an efflorescent salt. The invention is particularly useful for natural gaslines from heated basements to outside appliances, such as gaslights, barbecue pits and gasmeters. The efflorescent salt removes sufficient water from the gas in cold weather to keep the line from freezing or moisture condensing in it and the salt regenerates itself in warm outside temperatures by releasing its retained moisture to the gas stream which then can handle more moisture without freezing.

PATENTED DEC28 1971 3,629,995

INVENTORS:
JOHN MOTEN, JR.
WALTER A. KLUTHE

BY Gravely, Lieder & Woodruff
ATTORNEYS.

A METHOD FOR REDUCING MOISTURE CONTENT IN GAS

BACKGROUND OF THE INVENTION

For many years gas mains, particularly those operating at low to medium pressure, have been plagued with water problems, although complete moisture removal from the gas involved is not the most practical answer. Other industries also have this problem. Desiccants such as calcium sulfate, molecular sieves, etc., and others must be regenerated by an external heat source, or treated with a very dry gas for long periods of time, or both, to expedite their reuse.

In the distribution of fuel gases, air, L.P. gas, air components, acetylene, carbon dioxide, etc., the problem is not a matter of complete drying of the gas, if the dryer or desiccant used could offer some self-regenerative properties. The natural gas distribution system is an excellent example. A certain local gas company has over 70,000 gas lights on its lines. When any number of these lights are shut off due to a problem of moisture condensation or freezeups, a service man has to be sent out to clear the line, and this measure is no guarantee that the problem will not reoccur the following hour, day, etc. After the line is cleared, a drip leg or conventional desiccant may be installed. With a drip leg in the line, two problems will follow: (1) the leg must be drained when filled or overflow will occur, and (2) the drip leg leg will not remove the water vapor but will remove only liquid water.

If a conventional desiccant is installed, once saturated with water it must be replaced and/or regenerated. Replacement costs time and money; and regeneration also requires time, money and a heat source in order to expedite reuse and reduce the required inventory which would greatly outweigh the small cost and gas consumption of gas lights.

The present filter or dryer is concerned with both the removal of water vapor from gas streams, and the dryers regeneration in situ without the need of supporting equipment, such as heaters, timers, solenoids and the alternation of dryers during one's regeneration. The two phenomena involved in the present invention are those of hydrate formation and hydrate decomposition (efflorescence). More specifically, the efflorescent materials dry the gas to varying extents depending upon the drying agent used, and the temperatures of the system. The liberation of the adsorbed moisture to the system is accomplished by means of the hydrates decomposition or efflorescence or when this reliberation would not be detrimental to the system as determined by the gas streams moisture content or the ambient temperature. Quite generally, this system functions as a form of two-way humidity control.

In other words, if the moisture content of the gas stream falls below the equilibrium decomposition pressure of the efflorescent material, moisture will be removed from the efflorescent material. More generally this is accomplished by heating the efflorescent material.

This method will apply to any gas stream, the only limitation being that the gas and drying agent (efflorescent salt) do not enter into chemical reaction; since so long as the drying agent is not chemically changed, its behavior, as far as drying and regeneration is concerned, will repeat indefinitely so long as the gas is able to come into intimate contact with the salt. The intimate contact of the gas with the salt is important because it makes a flowing system efficient.

The uniqueness of this concept is not in the moisture removal properties, but in the self-regeneration properties. At constant temperature, the dryer responds to changes in the moisture content of the gas stream. At constant water vapor pressure (moisture content), the salt responds to temperature changes. When both temperature and vapor pressure (water) change, then the system responds to the temperature changes. What this means is that the system favors moisture removal (adsorption) under conditions of relatively high water vapor pressures (content) or lower temperatures (exact values vary with the salt used), and the converse under converse conditions. This has proven to be quite desirable in many instances since the ability of a gas to carry moisture vapor (its allowable moisture vapor content) varies directly with the temperature, and inversely with water vapor pressure (content) at that temperature. The materials described in this invention do not dry the gas as thoroughly as conventional desiccants such as molecular sieves, alumina, etc.; however, these materials need high temperatures and dry gas flow for regeneration, thus requiring the accessory equipment previously mentioned.

SUMMARY OF THE INVENTION

The present invention comprises a method for drying gas streams to prevent their freezing up or moisture condensing therein when exposed to cold ambient temperatures. The method uses efflorescent salts and further comprises the method hereinafter described and claimed.

DESCRIPTION OF THE DRAWINGS

In the drawings, wherein like numbers refer to like parts wherever they occur.

DETAILED DESCRIPTION

Figure 1:
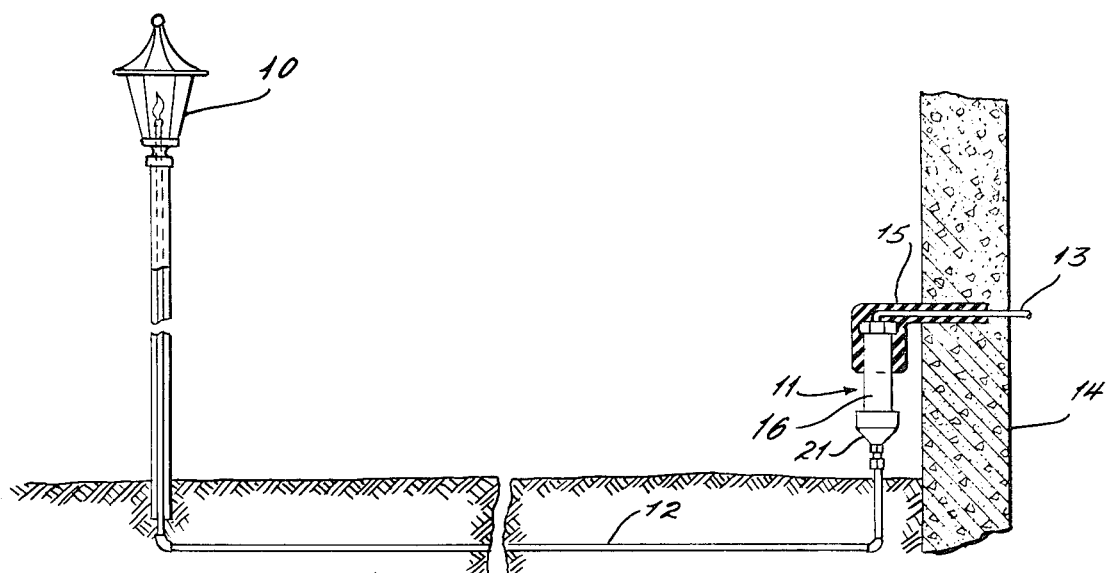
FIG. 1 is a schematic view of the present invention installed in a gaslight system.

The system shown in FIG. 1 includes a gaslight 10 and a filter or dryer 11. A conduit 12 connects the light 10 to the filter 11. A conduit 13 connects the filter 11 to a supply of gas from inside a house through a foundation wall 14. The connection is above ground and in winter the temperature inside the house or on the feed side of the wall 14 is warmer than the filter side or the outside of the wall 14. Thus the gas from the basement is warmer than the outside air. The gas can hold more moisture at higher temperatures so that when the gas is cooled by the outside air it will tend to lose its moisture-carrying capacity and if it falls to a temperature below its dew or saturation point the gas will lose moisture, i.e., moisture will condense out of the gas. If this outside or ambient temperature is below freezing the gasoline may freeze up.

It is the purpose of this invention to provide a method and structure for preventing this problem.

The conduits 12 and 13 are generally of copper and hence come to equilibrium temperature with their surroundings quite rapidly. The conduit 13 preferably is insulated 15 from inside the wall 14 to the top of the filter 11 and the filter itself preferably is insulated about one-third to one-half its length. The purpose for this is to prevent the gas from freezing up before it has a chance to lose its moisture to the salt inside of the filter 11. The insulation 15 is not necessary when the appliance to which the conduits 12 and 13 lead is a gasmeter which takes a high flow of gas. A gaslight 10 takes a low flow of gas and there is danger of condensation and freezing before the gas gets to the dryer 11.

Figure 2:
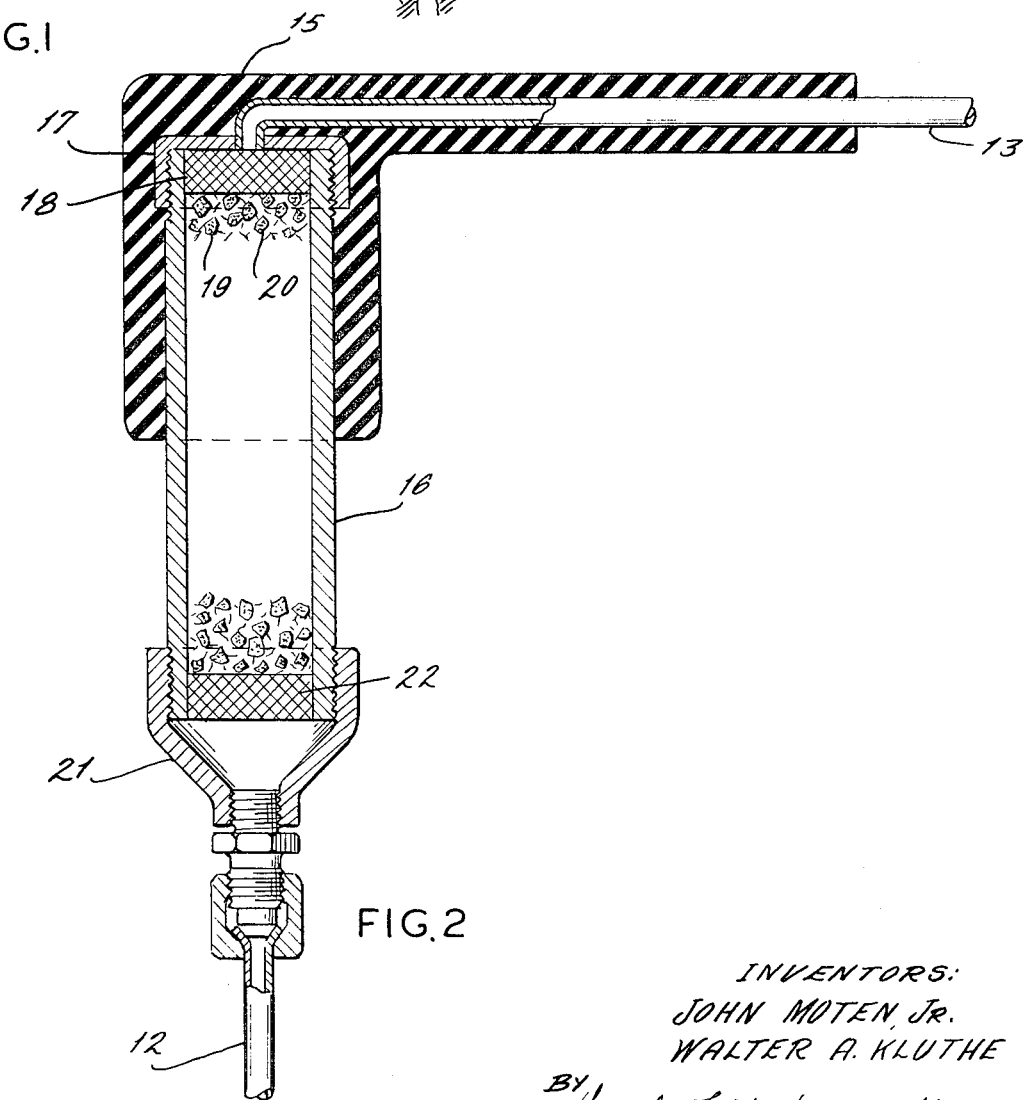
FIG. 2 is an enlarged vertical sectional view of the dryer shown in FIG. 1.

FIG. 2 shows a sectional view of the filter 11. The filter 11 comprises a steel body 16 having a top cap 17 threaded thereto. The gas inlet conduit 13 is attached to an opening in the cap 17 to admit gas from the house to the dryer 11. Placed at the top of the body 16 adjacent to the cap 17 is a layer of glass-wool fibers 18 for the purpose of preventing dust from falling into the gasline. This is also for handling.

The glass wool 18 is about 10 percent of the length of the body 16 in thickness. Adjacent to the glass wool 18 inside the body 16 is the drying material which consists of an efflorescent salt 19 deposited on a carrier 20. This preferably is $Na_2SO_4 \cdot OH_2O$ on zonolite.

At the other or bottom end of the body 16 is attached a reducer fitting 21 to which the conduit 12 is attached. For the last 10 percent of the length of the body 16 adjacent to said other end is glass-wool fibers 22. This is for the purpose of preventing any dust which may form from salt or carrier from getting into the gasline 12. Thus the glass-wool 18 is primarily a dust trap and other suitable means which does this without causing a large pressure drop could be used.

As mentioned, FIG. 1 shows a natural gas distribution system which includes outside appliances, i.e., gaslights, gas grills or even a gasmeter. In the winter or during cold weather, the lines supplying these units, or in the case of a meter, the unit itself, is subject to freezeups due to the moisture in the gas. That is, when the dewpoint (moisture content) of the gas is greater than the ambient temperature, moisture will condense. If the ambient temperature is 32° F. or below, freezing probably will occur. If all the gas distributed were "wet" (high dew points), then the problem would be simplified by centralized gas drying. (This system also is applicable to such an arrangement as it will remove any moisture which may seep into the system after initial drying). However, the moisture contents will vary with working pressure inside the gas main, type of gas main, location, and other factors such as water line leaks, etc.

The problem is, and has been for many years, quite a nuisance in the case of gaslights. This is because the supply lines are usually copper (an excellent thermal conductor) and shallow in depth. When this is coupled with their comparatively low cost ($40–100) and gas consumption (approximately $1.50 per month), any nonroutine service on them becomes comparatively expensive. For example, a service call to remove the ice from a clogged line could be $10.00 or more in cost to either the customer or the utility. If the utility bears this cost, it is not practical for repeated calls on the same light due to the low consumption, and if the customer has to bear such costs, poor customer relations soon develop.

If the installation of a conventional desiccant is used to remedy the problem, then as the moisture saturates the desiccant it must be either replaced or regenerated at the site. If replaced, then an inventory plus regeneration equipment must be maintained. If onsite regeneration is used, then such equipment must be purchased, made portable, and both replacement and regeneration labor costs must also be added. Thus, the minimum which would have to be performed with a conventional system would be two trips per year; in the fall in install the dryer, and in the spring to replace it. This could be stretched out by the use of larger systems, but then this requires higher investment per unit and customer acceptance of such bulky units at, or around their homes, and eventually replacement or regeneration.

One might also consider the use of a "drip" or catch leg or basin for removing condensed moisture, but they must be drained or they will overflow and are only effective for the removal of liquid water. Also, the presence of liquid water in the system assures a saturated gas (with respect to water) in a low flow system such as a gaslight. However, by using compounds possessing the efflorescent properties described previously, only one trip need be made to the problem location to install the dryer.

The drying agent preferably is $Na_2SO_4 \cdot 10H_2O$, or one of the other materials selected from the group described in *Critical Tables*, Vol. 7, Copyright 1930. The selection of the efflorescent salt depends upon its equilibrium vapor pressures at various temperatures (as described in the *Critical Tables* and the graph of FIG. 3), and the amount of moisture adsorbed aids in sizing the system. The system is installed outdoors ahead of the gasline supplying the light. Thus, the drying agent functions as a function of the ambient temperature. As the weather cools, the equilibrium vapor pressure above the system is less, and thus, the greater the water vapor pressure or mixture content of the gas, the more water adsorbed. The extent of drying is determined by the vapor pressure decomposition curves in the critical tables and elsewhere, since the depression of the moisture vapor pressure is directly proportioned to the dewpoint depression and water vapor concentration. During a warm spell or spring, the system reliberates this water vapor at a time when the gas can tolerate a higher dewpoint or moisture content without fear of freezeups.

Figure 3:
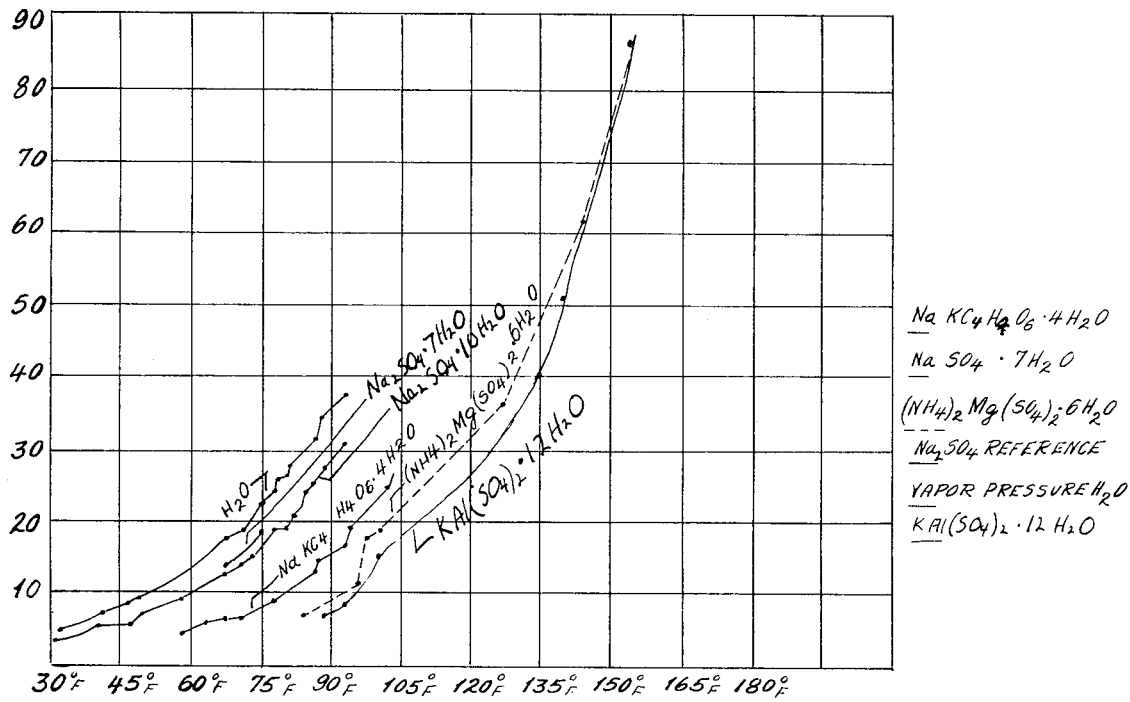
FIG. 3 is a graph showing vapor pressure against temperature of efflorescent salts particularly suitable for this invention.

There are many materials which possess this property over many temperature and water vapor pressure ranges. In St. Louis, Mo. in the midwest temperature zone, for example, over the normal temperature range it has been found that sodium sulfate works very well, both in terms of moisture adsorbed per mass of salt (180 gr. $H_2O$/142 gr. $Na_2SO_4$), and in vapor pressure equilibrium curve. The curve of FIG. 3 illustrates this. As can be observed, the equilibrium pressure for $Na_2SO_4 \cdot 10H_2O \leftrightarrows Na_2SO_4 + 10H_2O$ is less than normal water vapor pressure at that temperature, thus producing a dewpoint depression equal to the resulting salt equilibrium pressure vs. the normal water vapor pressure at that temperature.

For gases at other operating temperatures, one can use any of salts listed in the aforesaid *Critical Tables*, such as $CuSO_4 \cdot 5H_2O$; $MgSO_4 \cdot 7H_2O$; $ZnSO_4 \cdot 7H_2O$; etc., depending upon the temperature range involved and water-to-salt ratio desired or considered most practical.

The materials can be classified generally into three groups. These are:

(I) Simple Salts, such as:
A.     $Na_2SO_4$                  $(Na_3HAsO_4 \cdot 12H_2O)$
       $Na_2HPO_4$
       $CuSO_4$
       $MgSO_4$                    $Na K C_4H_4O_6 \cdot 4H_2O$
       $ZnSO_4$                    $(MgCL_2)$
       $MnSO_4$                    $(K_2CO_3)$
       $Na_3HPO_4$                 $Na_2B_4O_7$
       $Na_2CO_3$ (II) Alums, such as:
B.     $M^{(I)} M^{III} (SO_4)_2 \cdot 12H_2O$
       $M^{(I)}$=Na, K, $NH_4$, etc.
       $M^{III}$=Al, Fe, Cr, Ma, Ti
       EXAMPLE—$Na_2(Al)(SO_4)_2 \cdot 12H_2O$ (III) Schonites (Inorganic Chemistry Moeller—1959) such as:
C.     $M_2^I M^{II} (SO_4)_2 \cdot 6 H_2O$
       EXAMPLE—$Cs_2Cd(SO_4)_2 \cdot 6H_2O$ The drying agent used is preferably supported on an inert material such as cotton, zonolite, etc. or any material capable of holding the salt in place and minimizing pressure drops on low pressure systems, because the bulk of these salts fall to a powder when they effluoresce or dry, and must be supported.

In utilizing the curves shown in FIG. 3, the following discussion is helpful:

The top curve is a plot of the $H_2O$ Vapor pressure vs. temperature. The amount of $H_2O$ a given gas can hold ($H_2O$ Vapor) varies with the gas, temperature and pressure. The latter two being the most important. Below the $H_2O$ curve are equilibrium decomposition curves for various salts. What these curves relate is when the $H_2O$ vapor pressure is above the point for the salt at a given temperature then the salt will take on $H_2O$; when the $H_2O$ vapor pressure is less than that for a salt then it will liberate $H_2O$. Thus, for $Na_2SO_4$ at 75° F., if the $H_2O$ vapor pressure is above 17 mm. the salt will take on $H_2O$ until all the salt is saturated, or until the $H_2O$ vapor pressure is reduced to 17 mm. (for static system). One would choose the most desirable salt for his purpose by considering the operating temperature of the system and the $H_2O$ vapor pressure (or moisture conc.) of the entering gas. Thus for drying purposes one would choose a salt which is below the average incoming $H_2O$ vapor pressure, low enough below to give the desired exiting $H_2O$ vapor pressure or moisture content. If one wanted to use the salt for controlled $H_2O$ addition then the wet salt would be used in the converse.

For a salt drying system, for example, for a gaslight, one would install the system onsite for winter use (moisture removal). With the increase in temperature in spring and summer, the salt will reliberate the $H_2O$, since by the curve one notes the equilibrium decomposition pressure increases with temperature. This means there is lower $H_2O$ adsorption by the salt or $H_2O$ liberation, assuming the $H_2O$ content does not rise with temperature to the same extent as the decomposition pressure of the salt.

The same information could also be phrased in terms of relative humidity, which is the ratio of H$_2$O vapor pressure/H$_2$O sat. vapor pressure at a given temperature. Thus by knowing the exit or equilibrium relative humidity of a gas after passing over a particular salt, or salts, then one may choose the most practical salt for use in a particular system. One may determine the relative humidity data from a chart such as FIG. 3, by comparing the equilibrium pressures of the salts with that of H$_2$O over the temperature range of interest. By calculating the ratio of the salts' equilibrium pressure to that of H$_2$O at that temperature (saturation conditions) one has calculated the relative humidity of the exiting gas after passage over the salt. Thus the choice of salt depends upon the salt most suitable both for removal of water and for water reliberation. This is determined by calculation or by study of the system in reverse for the most practical reliberation cycle at minimum cost, etc. This is the key for the entire system, since a properly chosen salt for removal and regeneration is capable of becoming an independent entity.

SPECIFIC EXAMPLE

The container shown in FIG. 2 is a cylindrical pipe, 2 inches diameter × 18 inches to 24 inches long with 75 to 80 percent of the length filled with supported salt, and about 10 percent of the length on each end packed with glass wool.

The drying agent is adsorbed onto the support by placing the support (zonolite) into a hot (140°–180° F.) saturated solution of the salt (Na$_2$SO$_4$· 10H$_2$O) for 3 to 5 minutes, followed by filtering off of the support onto a screen with pores small enough to hold the support material. The support plus salt are dried in an oven at 425° F. Once dried, the material is placed in the previously described cylindrical holder. The ends of the holder (pipe) are threaded and a 2 inch to one-fourth inch reducer fitting is screwed on. Appropriate fittings are added to each end to connect the system to whatever it will be used on.

MODIFICATION

Figure 4:
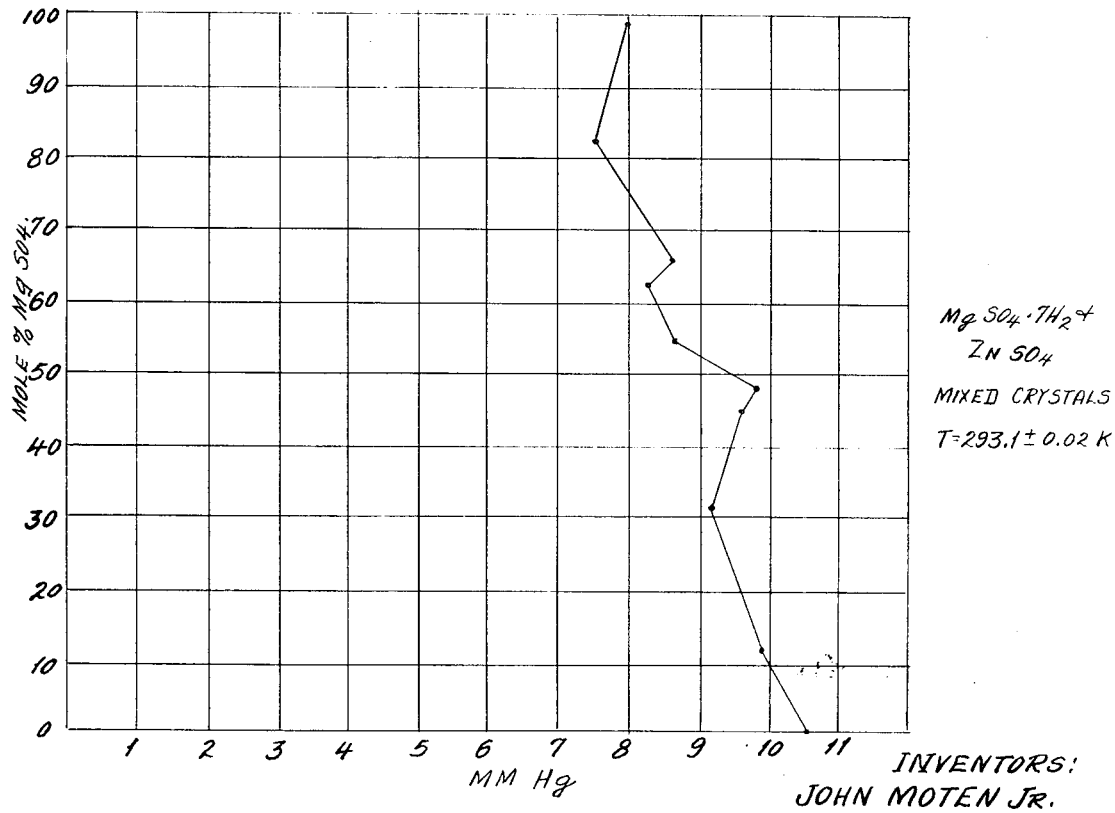
FIG. 4 is a graph showing a modification of the invention.

Another application of this invention, utilizing the same principle as in the foregoing is illustrated in FIG. 4. This shows a salt mixture which is useful for humidity control where the temperature is relatively constant. By utilizing the appropriate mixture of salts, as illustrated in FIG. 4 in mole percent and at relatively constant temperature, one then has a specific equilibrium decomposition pressure for the hydrate. Thus there is provided a system for humidity control at a given temperature. This has as advantage over a single salt in greater flexibility of the system in being tailored to different conditions. The salt mixture still has the properties of efflorescent and rehydration.

The explanation of the use of FIG. 3 applies to the use of FIG. 4 with certain minor notifications. As an example of the use of FIG.4, assume that it is desired to maintain a moisture vapor pressure of 10 mm. at the given temperature of 293.1° K. One goes up the vertical to the 10 mm. line and then follows the line to its intersection with the curve. Then one goes horizontally to the point representing 10 mole percent MgSO$_4$ in the salt mixture. As may be seen from the graph a mixture MgSO$_4$·7H$_2$O and ZnSO$_4$ containing 10 mole percent MgSO$_4$ will maintain this humidity.

For each salt mixture and each temperature the graph represented in FIG. 4 will change so the flexibility of this invention is very great.

We claim:

1. A method of maintaining the moisture content of a gas stream at preselected levels in a self-regenerating closed stem containing efflorescent material comprising the steps of:
   a. passing a stream of gas-containing water vapor over said efflorescent material having an equilibrium vapor pressure such that the moisture content of the gas will be maintained at a level such that condensation does not occur in the gas stream after it leaves the material
      1. the gas losing water vapor to the efflorescent material when the water vapor pressure in the gas is above the equilibrium vapor pressure of the material, and
      2. the gas picking up water vapor from the efflorescent material when the water vapor pressure of the gas is below the equilibrium vapor pressure of the material,
      3. so that the efflorescent material is self-regenerating when the water vapor pressure of the gas is below the equilibrium vapor pressure of the material and
   b. passing said gas stream from the efflorescent material to a gas appliance.

2. The method of claim 1 wherein the efflorescent material is substantially in equilibrium with ambient temperature.

3. The method of claim 2 wherein the efflorescent material is self-regenerated when the ambient temperature is raised.

4. The method of claim 1 including the step of regenerating the efflorescent material by decreasing the water vapor pressure of the gas stream below the equilibrium decomposition pressure of the efflorescent material.

5. The method of claim 1 wherein the efflorescent material is a salt selected from the group consisting of Na$_2$SO$_4$·10H$_2$O, CuSO$_4$·5H$_2$O, MgSO$_4$·7H$_2$O, ZnSO$_4$·7H$_2$O alums, and schonites.

6. The method of claim 1 wherein the efflorescent material is a salt supported on an inert material.

* * * * *